United States Patent Office 2,906,123
Patented Sept. 29, 1959

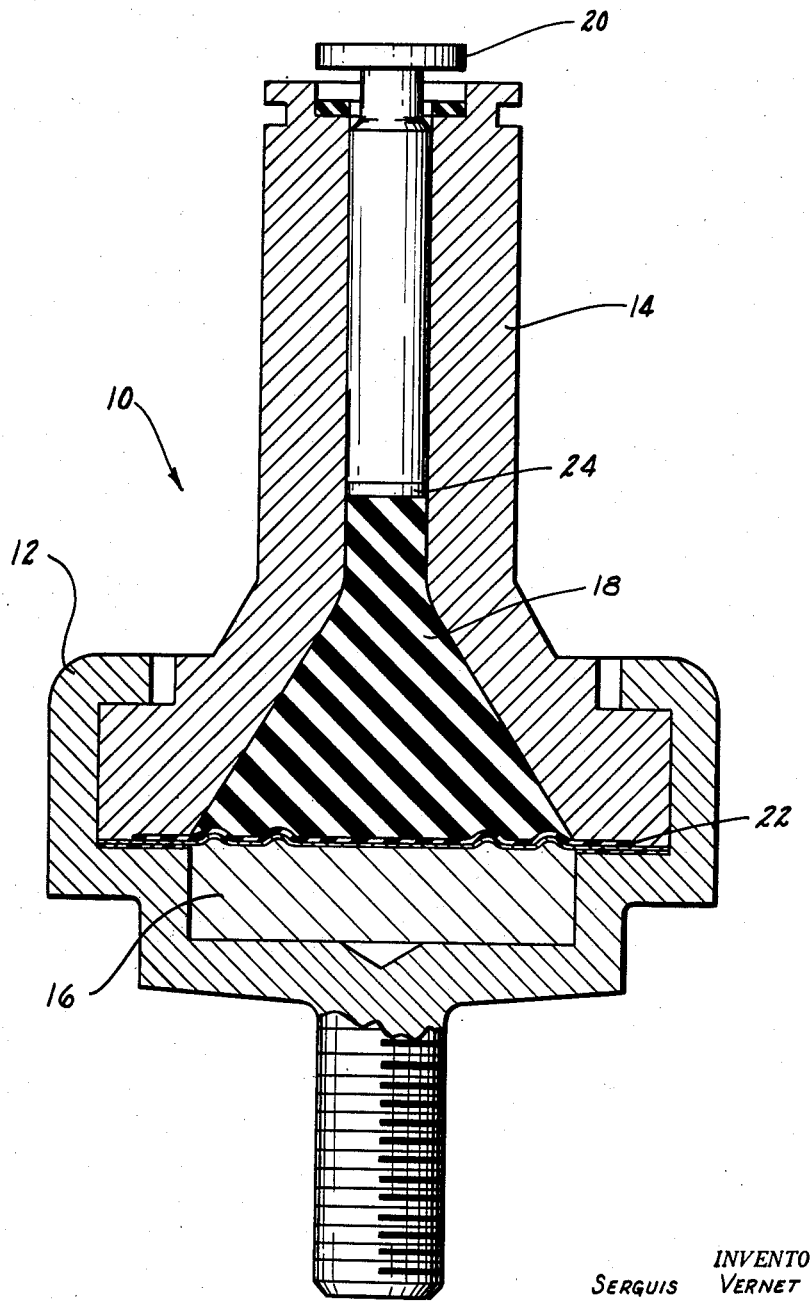

2,906,123

TEMPERATURE SENSITIVE ELEMENT HAVING A PLIABLE PLUG

Sergius Vernet and George Asakawa, Yellow Springs, Ohio, assignors, by direct and mesne assignments, to Antioch College, Yellow Springs, Ohio, a corporation of Ohio Application April 1, 1955, Serial No. 498,655

1 Claim. (Cl. 73—368.3)

The present invention relates to a novel composition of matter particularly but not exclusively adapted for use in the manufacture of a pliable plug for a thermostat in which the temperature responsive element is a heat sensitive material that undergoes a change in state particularly fusion, at predetermined temperatures with an increase in volume of the said material. The heat sensitive material when confined within a chamber and expanded during fusion transmits a force through a pliable plug to a movable part, such as a piston, of the thermostat.

Although the novel composition of the present invention will herein be described as utilized in the formation of a pliable plug for thermostats of the type which utilize a heat sensitive material characterized by its expansibility during fusion, it is within the contemplation of the present invention that the characteristics of the composition will make it adaptable to a wide variety of applications. Among these we contemplate the use of the novel composition of the present invention in such fields, for example, as low friction valve stem packings and shaft seals of various types including shafts which have longitudinal as well as rotational motion of the shaft.

Prior to the present invention such pliable plugs generally were composed of natural or synthetic rubber. Within the usual temperature ranges in which such elements have been used such rubber or synthetic rubber pliable plugs have been satisfactory. However, when used in devices intended for operation at temperature ranges in excess of approximately 250° F., such pliable rubber plugs frequently undergo changes which cause them to harden after repeated cycling and to lose their elasticity to such an extent that they are no longer operative. Such pliable plugs also tend to take a set and rupture when placed under heavy loads.

It is accordingly one object of the present invention to provide a novel composition of matter suitable for use as a pliable plug for such temperature responsive power elements and which will retain its pliability through repeated cycling at high temperatures.

Another object of the present invention is to provide a novel composition of matter which can be subjected to repeated compression at elevated temperatures without loss of pliability or other deleterious effects.

A further object of the present invention is to provide a novel composition of matter which is pliable, non-sticking and has a relatively low coefficient of surface friction.

Other objects of this invention will appear in the following description and appended claims, reference being had to the accompanying drawing forming a part of this specification.

The single figure of the drawing comprises a vertical section of a typical temperature responsive power element in which is shown one form of a pliable plug formed from the novel composition of matter of the present invention.

The novel composition of matter embodying the present invention comprises a plastic mass of discrete particles of a material selected from the group consisting of polytetrafluoroethylene, polymonochlorotrifluoroethylene, and a polyamide dispersed or embedded in either polyethylene, polybutene or polyisobutylene. The physical properties, particularly lubricity, of the resultant mixture in some instances may be modified advantageously by the further addition of butadiene acrylonitrile or graphite.

The novel composition of matter embodying the present invention utilizes the desired physical properties of the polytetrafluoroethylene, polymonochlorotrifluoroethylene and the polyamides but so modifies these properties by the new combination of materials as to produce a new composition of matter which possesses unusual properties not found in the separate elements thereof.

Polytetrafluoroethylene, polymonochlorotrifluoroethylene and polyamides exist as resins having unusual properties of being chemically inert to various media and materials with which they are used. They have a high degree of stability at relatively high temperatures. In addition, they provide surfaces having low coefficients of friction and thus have inherent lubricity and non-sticking qualities. These properties make the use of such materials very desirable in many fields, but many of these desirable properties also limit the fields of application of the materials. Thus, when discrete resinous particles of these materials are compacted and sintered, the particles are formed into a mass in which relative movement of the discrete particles is eliminated. Such a mass then takes on the form of the mold in which the compaction and sintering occurs. While the compacted and sintered mass may be subsequently deformed, its persistence in returning to the form of the mold gives it a "memory" which impairs its usefulness as a pliable plug. These materials when compacted in a mold and sintered also acquire a hardness which prevents them from conforming readily to the inner walls of a chamber or passage to be packed, plugged or sealed. These properties are well demonstrated in the case of polytetrafluoroethylene.

Using polytetrafluoroethylene as the basic material the following characteristics are imparted to the novel composition of the present invention:

(a) A high degree of inertness to all types of media and material.

(b) Inherent lubricating and non-sticking qualities.

(c) A high degree of stability at temperatures up to 500° F.

By the addition of the second component (polyethylene, polybutene or polyisobutylene) the following desirable results are obtained:

(a) The polytetrafluoroethylene particles are kept separated so as to prevent hardening which would otherwise result from sintering or partial sintering of the polytetrafluoroethylene particles.

(b) The polytetrafluoroethylene particles are able to move relatively easily in relation to each other.

(c) Any memory or elastomeric quality which would otherwise result if the polytetrafluoroethylene particles were fused into a homogeneous mass is prevented from taking place.

Desirable results in modifying the similar physical characteristics of polymonochlorotrifluoroethylene and polyamide resins also are achieved in a similar manner.

As examples of the novel composition of the present invention we cite the following:

*Example 1*

Percent by volume
Polyethylene _____ 5
Polytetrafluoroethylene, polymonochlorotrifluoroethylene or a polyamide (nylon) _____ 95

Example 2

| | Percent by volume |
|---|---|
| Polyethylene | 10 |
| Polytetrafluoroethylene, polymonochlorotrifluoroethylene or a polyamide (nylon) | 90 |

Example 3

| | Percent by volume |
|---|---|
| Polyisobutylene (mol. wt. 2000) | 30 |
| Polytetrafluoroethylene, polymonochlorotrifluoroethylene or a polyamide (nylon) | 70 |

In compounding the novel composition of the present invention we take granular polytetrafluoroethylene, polymonochlorotrifluoroethylene, or polyamide and combine it with polyethylene or polyisobutylene so as to coat the individual granules therewith to keep the said granules separated and to prevent sintering thereof and to leave them free to move or flow relative to each other.

In preparing the above formulations it is important that the granules of polytetrafluoroethylene, polymonochlorotrifluoroethylene or polyamide are dispersed throughout or coated by the second material. This has been accomplished by any one of the following methods:

(a) Dissolve the binder material; the polyethylene, polybutene or polyisobutylene; in an aromatic type carrier solvent such as toluene and xylene or a halogenated type solvent such as ethylenedichloride and propylenedichloride. The polytetrafluoroethylene, polymonochlorotrifluoroethylene or polyamide granules are then mixed with the solution and the solvent driven off by heat and/or vacuum drying thus insuring a uniform coat over each particle of polytetrafluoroethylene, polymonochlorotrifluoroethylene or polyamide.

(b) Add an aqueous emulsion of polyethylene, polybutene or polyisobutylene to the granular polytetrafluoroethylene, polymonochlorotrifluoroethylene or polyamide; break the emulsion to coat the granules; and thereafter remove the water of the emulsion by heating, vacuum drying and/or filtering.

(c) The mechanical mixing of the polytetrafluoroethylene, polymonochlorotrifluoroethylene or polyamide granules with polyethylene powder; the mixing with small particles of polyisobutylene; or the mixing directly with liquid polybutene is also possible and has been carried out successfully. Such mechanical mixtures are pressed under pressure into final form by means of a suitable mold.

The term "polyethylene" as used herein refers to a translucent white resin formed by the polymerization of ethylene at high temperatures and high pressures. These resins are essentially linear polymers of ethylene. The structure of the resin is partly crystalline and partly amorphous. Polyethylene is produced in a wide range of molecular weights. Those of lower molecular weight (10,000 to 14,000) change from a solid to a soft plastic mass in a temperature range of 225° to 235° F., while resins of higher average molecular weight begin to soften in the same temperaure interval but are quite viscous when they go above the softening temperature range. For the purposes of the present invention we have found that those polyethylenes of the lower molecular weights are most suitable but the selection of a suitable resin is, of course, dependent upon the temperature ranges to which the finished product will be subjected.

The terms "polyisobutylene" and "polybutene" are used herein to refer to polymers of isobutylene and butenes respectively and cover a wide group of synthetic polymers of isobutenes and butenes. For the purposes of the present invention the sole limiting factor in the selection of a material from this group is the use to which the novel composition of the present invention will be put.

In commercial usage, the terms "polyisobutylene" and "polybutene" are used somewhat indiscriminately. However, polyisobutylenes, in the strict sense of the term, are polymers of isobutylene. For the purposes of the present invention we prefer to utilize those polyisobutylenes having molecular weights less than 25,000 although as previously pointed out the selection is dependent upon the use made of the ultimate product incorporating the novel composition of the present invention.

Polybutenes, in the strict sense of the term, are synthetic polymers obtained by the polymerization of normal and branched chain butenes. They are pale colored, chemically inert liquids of moderate to high viscosity and tackiness. Compared to polymers generally they are of relatively low molecular weight. The polymerization reaction produces polybutenes having molecular weights in the range of 800 to 1500 depending on the conditions of manufacture. The higher members of the liquid series approach progressively the characteristics of a plastic solid.

In the formulation of the novel composition of the present invention we have utilized in many instances the polybutenes of relatively higher molecular weight. However, as pointed out above in regard to the polyisobutylenes, we have found that the selection of a particular polybutene is limited not by its adaptability to formulation in the present compositions but rather by the ultimate use to which the novel composition will be put. Accordingly, it is within the scope of the present invention to utilize any of the wide range of polybutenes.

In the formulation of the novel composition of the present invention we have found that it is desirable in most instances to limit the content of polytetrafluoroethylene, polymonochlorotrifluoroethylene and polyamide to from approximately 60% to 95% by volume. Some advantage over prior art compositions can be secured by operating outside of these proportions but a very superior composition is secured within them.

We have also found that in some instances it is desirable to include in the formulation of the novel composition of the present invention an additional component such as butadiene acrylonitrile (in the form of a rubbery copolymer) or graphite or both to increase the lubricating properties of the composition. We add the lubricity agent after the discrete resinous particles have been embedded in the binder.

The proportion of the lubricity agent, although minor relative to the other components, cannot be stated with exactness since the compositions to which it is added vary considerably in presenting from inherently low friction to inherently high friction surfaces. However, securing the desired lubricity in any chosen pliable plug composition is merely a matter of a few simple tests since the lubricity agent does not affect the ratios or necessary properties of the first components as set forth above.

The term "heat sensitive material" as used herein refers to members of that class of compound and mixtures of compounds each of which expands during fusion or during polymorphic modification, mesomorphic modification, and the like wherein such expansion occurs at a definite temperature or over a substantially definite range of temperatures. The heat sensitive materials which have found most favor in the art are crystalline and depend for their usefulness on their expansibility at a relatively specific temperature during fusion. Thus, such materials are generally described as heat sensitive materials characterized by their expansibility during fusion, it being understood that other physical changes effecting an expansion may be fully equivalent to the fusion process.

A preferred use of the composition of matter here disclosed is shown in the accompanying drawing in which it is used in a temperature responsive power element 10 composed of a cup 12 and a piston guide 14 affixed in the mouth of said cup and extending upwardly therefrom. A heat sensitive material 16 contained in cup 12 expands when subjected to a predetermined temperature. The expansion of the heat sensitive material 16 is transmitted through the pliable plug 18 to piston 20. The pliable plug is preferably formed of the novel composition of matter embodying the present invention.

A diaphragm 22 is disposed over the heat sensitive material 16 to prevent the escape of any portion thereof and an anti-extrusion disc 24 is placed between the upper end of pliable plug 18 and the lower end of piston 20 to prevent the periphery of the plug 18 from being pinched between the lower edge of piston 20 and the cylinder wall of piston guide 14.

In the usual application of such elements the piston 20 is linked to a valve mechanism to selectively open and close the same in response to ambient temperature changes. Upon expansion of the heat sensitive material 16, the pliable plug 18 is squeezed so that it flows upwardly and forces piston 20 upward. When the heat sensitive material returns to its unexpanded condition the piston 20 is forced downward back into its original position by a spring associated with the valve it operates and this, in turn, returns the pliable plug 18 to its original form and position. The pliable plug 18 when formed of the novel composition of matter herein as disclosed is free-flowing, non-sticking and inherently lubricating. It will retain its plasticity after repeated operation and under high temperatures.

The use of any of the novel compositions of matter herein disclosed in forming the pliable plug 18 permits extended use of the thermally responsive power elements for long periods of time under operating conditions which would cause rapid deterioration of previously used materials. Attempts to form such plugs from polytetrafluoroethylene, polymonochlorotrifluoroethylene or polyamides have been defeated because of the inherent physical properties of such materials when molded, pressed and sintered. However, when used as a constituent of the novel composition of matter herein disclosed, their desirable physical properties are made readily available while preserving the flexibility or pliability of the completed object.

Having thus described our invention, we claim:

A power element comprising a cup element; thermally expansible material within said cup element; a diaphragm sealing said expansible material within the cup element; a cover element overlying the diaphragm; said cover element having a first bore tapering away from the diaphragm and a second uniform diameter bore extending from the outer end of the tapering bore; a piston slidably positioned within said second bore; and a plug of pliable force-transmitting material between the diaphragm and piston; said plug being formed of discrete resinous particles distributed in a binder material; said discrete resinous particles being formed of a material selected from the group consisting of polytetrafluoroethylene, polymonochlorotrifluoroethylene, and nylon; said binder material being selected from the group consisting of polyethylene, polyisobutylene, and polybutene.

References Cited in the file of this patent

UNITED STATES PATENTS

| | | |
|---|---|---|
| 2,115,502 | Vernet | Apr. 26, 1938 |
| 2,368,181 | Vernet | Jan. 30, 1945 |
| 2,400,091 | Alfthan | May 14, 1946 |
| 2,465,513 | Carasso | Mar. 29, 1949 |
| 2,466,963 | Patrick | Apr. 12, 1949 |
| 2,578,523 | Llewellyn | Dec. 11, 1951 |